UNITED STATES PATENT OFFICE.

GEORGE E. PATRICK, OF AMES, IOWA.

PROCESS OF DETERMINING THE PERCENTAGE OF WATER IN BUTTER.

No. 864,913.  Specification of Letters Patent.  Patented Sept. 3, 1907.

Application filed July 12, 1907. Serial No. 383,539.

*To all whom it may concern:*

Be it known that I, GEORGE E. PATRICK, a citizen of the United States, residing at Washington, District of Columbia, (with legal residence at Ames, Iowa,) have invented a new and useful Improvement in the Process of Determining the Percentage of Water in Butter, of which the following is a specification.

This invention relates to the process of determining the water content of butter by heating in an aluminium or other metallic vessel a weighed portion of the butter until all water is evaporated and then weighing again, and has for its object to render the process more expeditious.

This application is made under the act of March 3, 1883, chapter 143 (22 Stat. 625) and the invention herein described and claimed may be used by the Government of the United States or any of its officers or employees in the prosecution of work for the United States, or by any person in the United States, without the payment of any royalty thereon.

Heretofore, in carrying out this process the usual custom has been to place the vessel in an oven heated to about the temperature of boiling water for an hour or more, until by repeated weighings it is found that the loss of weight has ceased. Also, it has been proposed (by Richmond, *Laboratory Book of Dairy Analysis*, London, 1905, p. 60) to heat the vessel supported on a tripod or a sandbath, over a very small flame, stirring the contents constantly with a stirring rod, until frothing has ceased.

In the first of these methods it is impracticable to hasten the evaporation by a very much higher degree of heat, because to do this would cause charring or decomposition of some of the constituents of the butter before all of the water would be evaporated; and in the second method the prevention of charring by stirring with a rod is a difficult and tiresome task, when the degree of heat is sufficient for really rapid drying.

In my process I attain the desired end, namely, the rapid evaporation of all the water from the butter without serious decomposition of any constituent of the butter, by keeping the vessel in constant motion while heating it directly over the flame of a lamp.

The details of my process are as follows: I weigh ten grams of butter into an aluminium beaker, grasp the beaker near its top with a clamp or beaker-holder, and, holding it in a vertical position and keeping it in constant rotation by motion of the hand, heat it over the flame of an alcohol lamp. In order to render the flame steady, concentrate the heat, and prevent the deposition of soot upon the bottom of the beaker, I place upon the alcohol lamp a cone-shaped chimney about six inches high, made of asbestos paper and well ventilated at the base; but this chimney, while advantageous, is not an indispensable part of the apparatus. The intensity of the heat applied to the beaker is regulated by the distance the latter is held above the flame, or above the top of the cone. While the water of the butter is actively boiling, under the combined influence of heat and the rotary motion, there is but little danger of over-heating the charge. During this stage of the process the sides of the beaker are not allowed to reach a temperature at which "sizzling" is produced when they are touched with the moistened finger, but the bottom of the beaker is necessarily at such a temperature to effect the boiling off of the water. After the greater part of the water has been expelled and the final foaming has occurred, the danger of over-heating is much greater, and to avoid error from this source, I expel the remaining water and dispel the greater part of the foam by repeatedly heating the sides of the beaker just to the sizzling temperature and immediately thereafter throwing the foam upon them by a lively rotation. This treatment I continue until the amount of foam ceases to sensibly diminish. And toward the end of this treatment I re-heat the bottom of the beaker once or twice just to the sizzling temperature, in order to make sure that no more foam can be developed under these conditions, and, therefore, that all water has been expelled. By this procedure I am able to completely dry the charge of butter in a few minutes, with only a very slight discoloration, if any at all.

I claim:

The process of determining water in butter, which consists in heating a weighed portion of butter in an aluminium beaker with constant rotation over a current of hot air till most of the water has boiled away and the final foaming has occurred, then exposing the sides of the beaker to the hot air at a sizzling temperature while just maintaining the bottom heat, then cooling and reweighing.

GEORGE E. PATRICK.

Witnesses:
  HERBERT S. BAILEY,
  JNO. T. KEISTER.